United States Patent [19]
Armbruster

[11] 3,991,621
[45] Nov. 16, 1976

[54] ROTATABLE VEHICLE WHEEL SUPPORT FOR SPIN BALANCER

[76] Inventor: Joseph M. Armbruster, P.O. Box 840, Waynesville, N.C. 28786

[22] Filed: Aug. 29, 1975

[21] Appl. No.: 609,099

[52] U.S. Cl. ................................................ 73/479
[51] Int. Cl.² .......................................... G01M 1/16
[58] Field of Search ............... 73/66, 459, 460, 462, 73/471, 479

[56] References Cited
UNITED STATES PATENTS 2,120,925   6/1938   Webster................................ 73/479

FOREIGN PATENTS OR APPLICATIONS 854,517   1/1940    France.................................... 73/66
945,072   12/1963   United Kingdom................... 73/66

Primary Examiner—James J. Gill
Attorney, Agent, or Firm—Clarence A. O'Brien; Harvey B. Jacobson

[57] ABSTRACT

A support is provided including a base and an upright having its lower ends supported from the base. A generally horizontal support arm having one end supported from an upper end of the upright for oscillation about a horizontal axis extended transversely of the support arm is also provided and the other free end portion of the support arm projects over the base. An upstanding compression spring extends between and is interconnected between the base and the free swinging end portion of the support arm. Also, the free end of the support arm includes structure for journaling a vehicle wheel having a tire mounted thereon from the support arm for rapid spinning thereon. The free end of the support arm also includes structure by which a dynamic balancer pickup pad or a pickup pad from a strobe balancer may be supported from the support arm and by utilization of the support, a vehicle wheel having a tire mounted thereon may be spun at high speeds for balancing purposes.

9 Claims, 4 Drawing Figures

ROTATABLE VEHICLE WHEEL SUPPORT FOR SPIN BALANCER

BACKGROUND OF THE INVENTION

While some vehicle wheel balancing machines are operative to support a vehicle wheel having a tire mounted thereon and spin the wheel and tire at high speed while at the same time determining at which positions on the periphery of the wheel rim balancing weights should be added to dynamically balance the tire and wheel assembly, machines of this type are very expensive and thus are not used by small tire shops and service stations or garages.

More frequently, wheel balancing machines for dynamically balancing vehicle wheels having tires mounted thereon are of the type including a motor driven friction wheel for spinning the associated wheel and tire assembly on a vehicle and a vibration pickup pad is attached to the support structure for the wheel being spun. However, such devices may not be readily utilized in conjunction with the front wheels of four-wheel drive vehicles and on spare wheel and tire assemblies without mounting the spare wheel and tire on the vehicle.

Accordingly, there is a need to provide an apparatus whereby the front wheel and tire assembly of four-wheel drive vehicles and the spare wheel and tire assemblies of other vehicles may be rotatably supported, as though mounted on a vehicle, and in position to be engaged and driven by a motorized friction drive assembly of the type herein abovementioned and also with the support structure for the wheel being spun including means for supporting a pickup pad thereform.

Previously patented devices including some of the structural and operational features of the instant invention are disclosed in U.S. Pat. Nos. 2,349,552, 3,452,603, 3,578,045 and 3,581,576. However, these previously patented devices, for various reasons, are not readily adaptable to perform all of the functions of the instant invention.

BRIEF DESCRIPTION OF THE INVENTION

The vehicle wheel support of the instant invention includes a support are mounted at one end for oscillation about a horizontal transverse axis therefor for vertical swinging of the other end of the support arm, which other end includes structure for journaling a vehicle wheel and tire assembly therefrom. An intermediate portion of the support arm is yieldingly upwardly biased by spring structure operatively connected thereto and shock absorbing structure is also operatively attached to the intermediate portion of the support arm for dampening vertical oscillations thereof.

The main object of this invention is to provide a support upon which a vehicle wheel and tire assembly to be spin balanced may be rotated at high speed and which will oscillate vertically in response to unbalance of the associated wheel and tire assembly and further include a mounting point to which a vibration sensing pickup pad may be attached.

Another object of this invention, in accordance with the immediately preceding object, is to provide a wheel support capable of supporting an associated vehicle wheel and tire assembly in closely spaced relation relative to a support surface upon which a motorized friction drive assembly for spinning a vehicle wheel and tire assembly may be disposed in driving contact with the wheel and tire assembly mounted on the wheel support.

Yet another object of this invention is to provide a wheel support in accordance with the preceding objects and which may be readily adjusted to compensate for wheel and tire assemblies of different diameters.

A final object of this invention to be specifically enumerated herein is to provide a wheel support which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
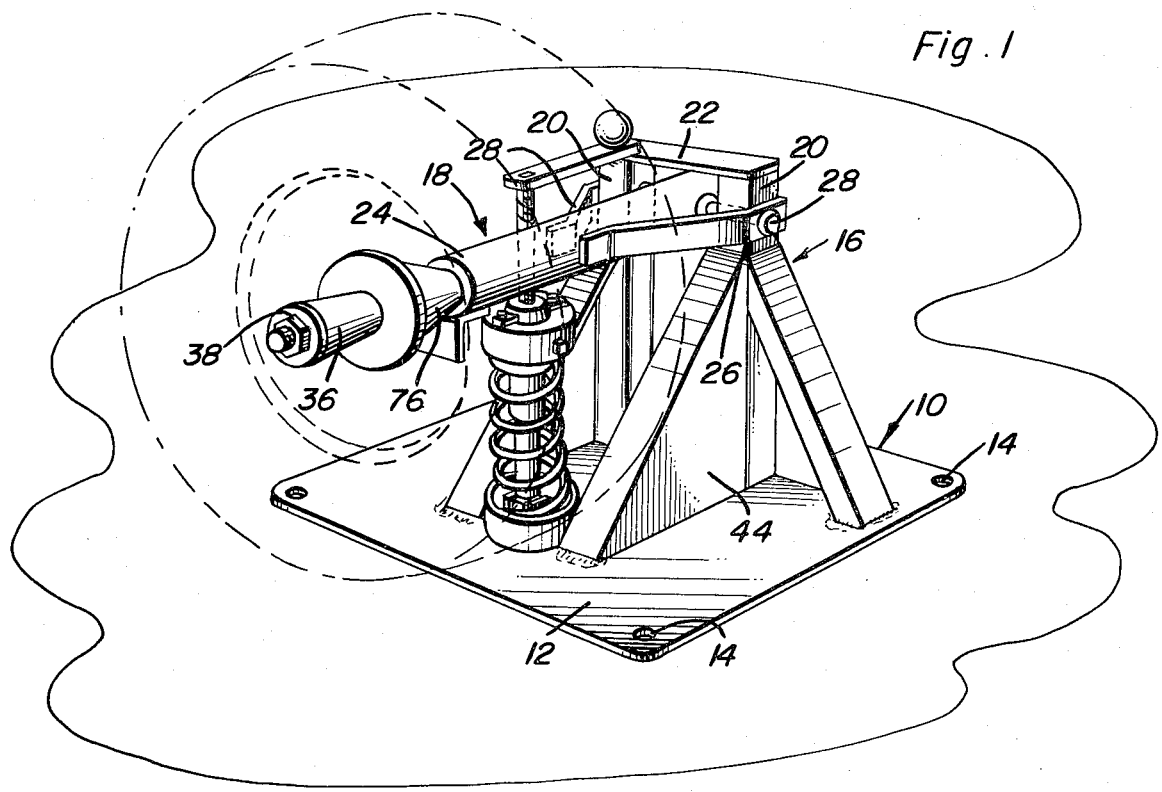
FIG. 1 is a perspective view of the wheel support structure of the instant invention.
Figure 2:
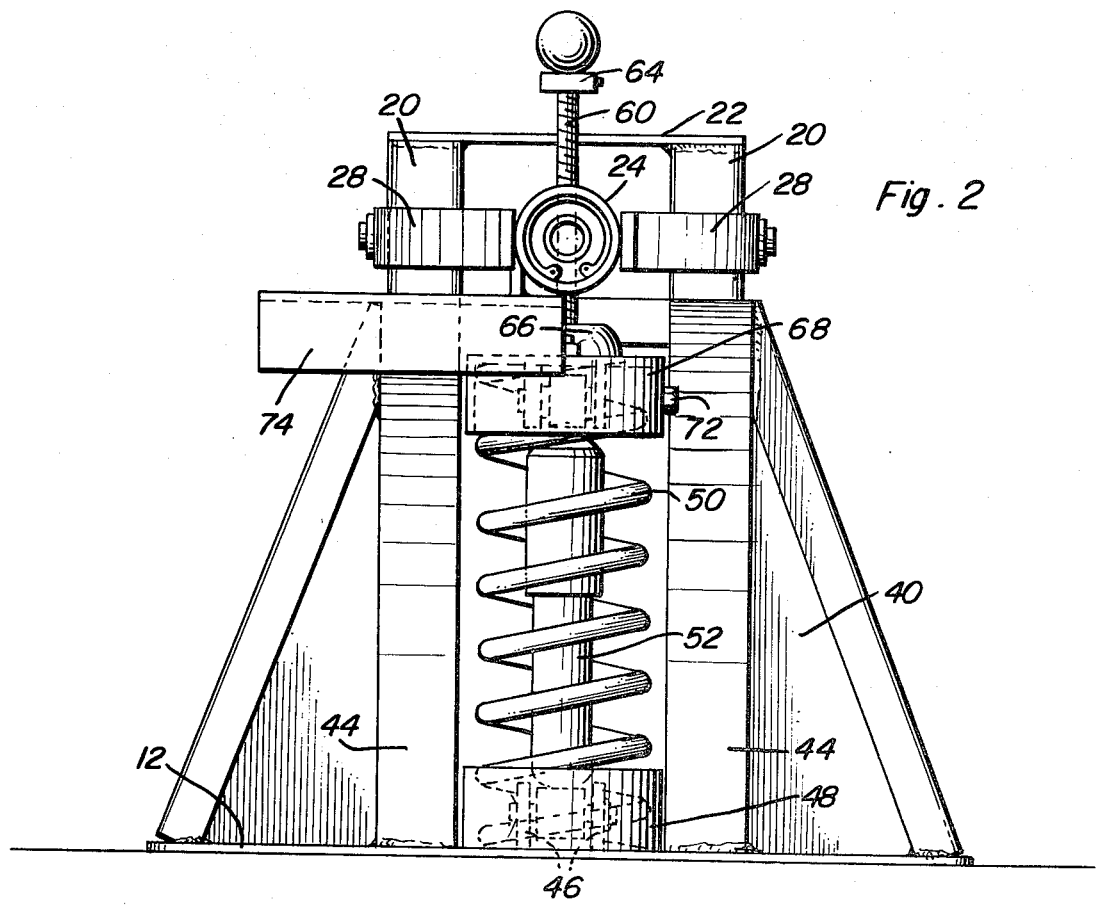
FIG. 2 is an enlarged front elevational view of the wheel support structure.
Figure 3:
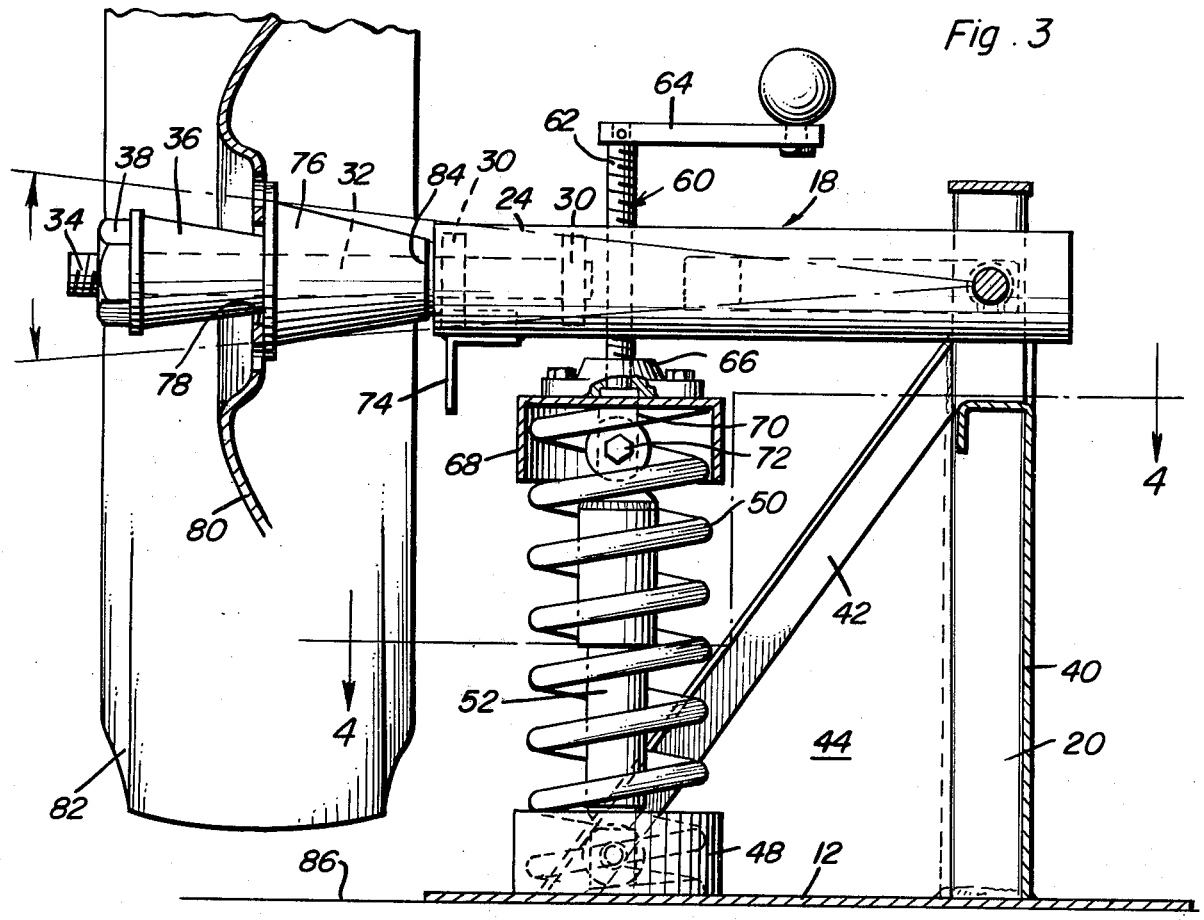
FIG. 3 is an enlarged fragmentary, longitudinal vertical sectional view taken substantially upon a plane passing through the longitudinal center-line of the wheel support.
Figure 4:
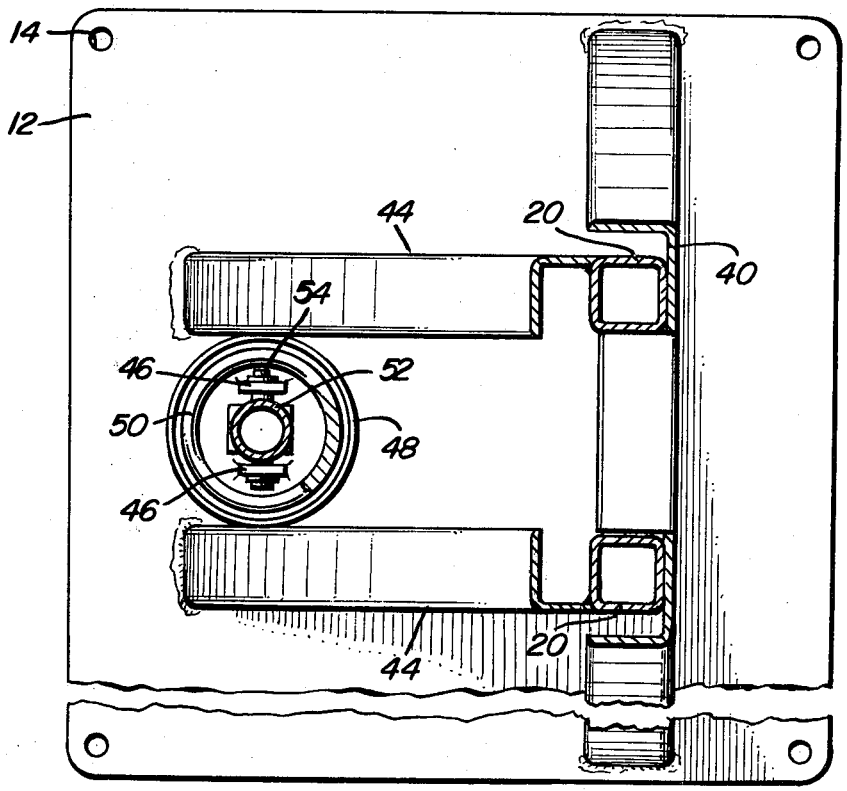
FIG. 4 is a fragmentary, horizontal sectional view taken substantially upon the plane indicated by the section line 4—4 of FIG. 3.

Referring now more specifically to the drawings, the numeral 10 generally designates the wheel support structure of the instant invention. The structure 10 includes a horizontal base plate 12 which is generally rectangular in configuration and includes corner apertures 14 for the securement of fasteners (not shown) thereto in order to secure the base 12 to a suitable support surface.

The assembly 10 further includes an upright structure referred to in general by the reference numeral 16 and a horizontal support arm structure referred to in general by the reference numeral 18. The upright structure 16 comprises a pair of upstanding laterally spaced apart standards 20 rigidly secured to the base 12 at their lower ends and rigidly interconnected at their upper ends by means of a horizontal brace member 22 extending and secured therebetween. The support arm structure 18 comprises an elongated tubular member 24 having one end received between the upper ends of the standards 20 and including a pair of laterally outwardly offset brace arms 26 extending longitudinally of the tubular member 24 on opposite sides thereof. The ends of the brace arms 26 projecting toward the free end of the support arm structure 18 include inwardly directed terminal ends 28 secured to the corresponding opposite sides of the tubular member 24. The other pair of ends of the brace arms are disposed on the remote sides of the standards 20 and a pivot shaft 28 is secured through the brace arms 26, the upper ends of the standards 20 and the end of the tubular member 24 disposed between the standards 20. In this manner, the tubular member is mounted from the upright structure 16 for vertical oscillation of the free end thereof remote from the standards 20.

The free end of the tubular member 24 has a pair of journal bearings 30 secured therein and which rotatably journal one end of a support shaft 32. The other end of the support shaft 32 projects outwardly of the free end of the tubular member and is provided with acme threads 34, an anchor cone 36 slidable thereon and a nut 38 threadedly engaged with the shaft 32.

A truncated pyramidal cover panel 40 extends over the rear sides of the standards 20 and is secured to base 12 as well as the remote sides of the upper ends of the standards 20. In addition, the standards 20 are braced by rearwardly and upwardly inclined braces 42 and opposite side cover panels 44 are secured over the braces 42 and between the latter and the lower end portions of the standards 20.

The base 12 includes a pair of upwardly projecting apertured mounting lugs 46 disposed between the lower forward ends of the braces 42 and the lugs 46 are enclosed within an upwardly opening cup structure 48 secured to the base 12.

The lower end of a coiled compression spring 50 is seated within the cup structure 48 and the lower end of an airplane-type shock absorber 52 has its lower end secured between the lugs 46 by means of a fastener 54.

A connecting assembly generally referred to by the reference numeral 60 is provided and includes a screw shaft 62 arranged in upstanding position and having a crank arm 64 on its upper end. The intermediate portion of shaft 62 is threaded through the tubular member 24 and the lower end of the screw shaft 62 is held captive in a bearing member 66 bolted to a downwardly opening cup structure 68 spaced vertically above and opposing the lower cup structure 48. The upper end of the compression spring is seated within the downwardly opening upper cup structure 68 and the latter additionally includes depending apertured mounting lugs 70 disposed therein corresponding to the mounting lugs 46 and between which the upper end of the shock absorber 52 is secured by means of a fastener 72. Still further, a pickup pad mount 74 is welded to the under side of the outer free end of the tubular member 24.

In operation, a spacing cone 76 is first slipped over the free end of the shaft 32 and the wheel to be balanced thereafter has its center opening slipped over the shaft 32. Thereafter, the anchor cone 36 is slipped onto the shaft 32 and tightened against the inner periphery of the center opening 78 of the wheel 80 having a tire 82 mounted thereon. After the wheel 80 and tire 82 have been mounted on the shaft 32 with the spacing cone 76 abutted tightly against a circumferential shoulder 84 carried by the inner end of the shaft 32 immediately outwardly of the free end of the tubular member 24, a motor driven friction drive assembly may be engaged with the lower periphery of the wheel 82 in order to spin the latter and the wheel 80. The vibration detecting and pickup unit mounted on the bracket 74 may then be utilized, in conjunction with a strobe-type balancing unit, to determine at what points about the outer periphery of the wheel 80 balance weights should be added. Further, the assembly 10 may further be utilized in conjunction with a type of wheel balancing unit which utilizes a wheel mounted weight position indicating device and which is adjusted during spinning of the wheel 80 to achieve proper balance of the wheel 80 and is thereafter read when spinning of the wheel 80 has terminated in order to indicate the location and amount of weight to be added to the periphery of the wheel 80.

The screw shaft 62 is provided to vary the elevation of the shaft 32 whereby the apparatus 10 may be adjusted for wheels of different diameters in relation to the floor 86 upon which the base 12 rests.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A support for spin balancing a vehicle wheel having a tire mounted thereon, said support including a base, an upright having its lower end supported from said base, a generally horizontal support arm having one end supported from an upper end of said upright for oscillation about a horizontal axis extending transversely of said support arm and a free end portion projecting over said base, said free end portion including journal means for journaling a vehicle wheel therefrom with the axis of rotation of said wheel extending longitudinally of said arm, and upstanding compression spring means supported at its lower end from said base, and connecting means connecting the upper end of said spring to the free end portion of said support arm between said journal means and the axis of oscillation of said support arm.

2. The combination of claim 1 including means carried by the free end portion of said support arm adapted to removably support a dynamic pickup pad for a wheel spin balancer therefrom.

3. The combination of claim 1 including means carried by the free end portion of said support arm adapted to removably support a pickup pad for a strobe-type spin balancer.

4. The combination of claim 1 including an upstanding airplane-type shock absorber extending and connected between the free end portion of said support arm and said base.

5. The combination of claim 4 wherein said compression spring comprises a coil spring and said airplane shock abosrber is disposed within said coil spring.

6. The combination of claim 1 wherein said upright includes a pair of side-by-side standards, said one end of said support arm being received between the upper ends of said standard and including laterally outwardly offset brace arms extending longitudinally of said support arm, the ends of said brace arms projecting toward said other end of said support arm including inwardly directed terminal ends secured to the corresponding opposite sides of said support arm, the other pair of ends of said brace arms being disposed on remote sides of said standards, and pivot fastener means secured through said other pair of ends of said brace arms.

7. The combination of claim 1 wherein said connecting means includes means operative to adjustably shift said free end portion of said support arm toward and away from the adjacent end of said compression spring means.

8. The combination of claim 7 including an upstanding airplane-type shock absorber extending and connected between the free end portion of said support arm and said base.

9. The combination of claim 8 wherein said airplane-type shock absorber is disposed in a condition intermediate its fully collapsed and fully extended positions when said compression spring is in a static substantially non-compressed condition.

* * * * *